United States Patent [19]

Nel et al.

[11] 4,361,633
[45] Nov. 30, 1982

[54] LAMINAR ELECTRICAL CELLS AND BATTERIES

[75] Inventors: Pierre E. Nel, Lynnfield; Joanne C. Pleskowicz, Billerica, both of Mass.

[73] Assignee: Polaroid Corporation, Cambridge, Mass.

[21] Appl. No.: 295,267

[22] Filed: Aug. 24, 1981

[51] Int. Cl.$^3$ .............................................. H01M 6/12
[52] U.S. Cl. .................................. 429/162; 429/152; 429/201; 429/224; 429/229
[58] Field of Search ........ 429/162, 152, 224, 229–231, 429/199–201

[56] References Cited

U.S. PATENT DOCUMENTS

| | | | |
|---|---|---|---|
| Re. 30,458 | 12/1980 | Uetani et al. | 429/201 |
| 3,795,545 | 3/1974 | Kamai | 136/107 |
| 3,874,932 | 4/1975 | Uetani et al. | 136/103 |
| 3,888,699 | 6/1975 | Urry | 136/107 |
| 4,019,251 | 4/1977 | McCole | 29/623.2 |
| 4,105,815 | 8/1978 | Buchler | 429/152 |
| 4,105,831 | 8/1978 | Plasse | 429/86 |
| 4,119,770 | 10/1978 | Land | 429/152 |
| 4,125,684 | 11/1978 | Land | 429/122 |
| 4,125,685 | 11/1978 | Bloom et al. | 429/122 |
| 4,161,815 | 7/1979 | Land et al. | 29/623.4 |
| 4,254,191 | 3/1981 | Kniazzeh | 429/162 |
| 4,256,813 | 3/1981 | Kniazzeh | 429/86 |

*Primary Examiner*—Charles F. Lefevour
*Attorney, Agent, or Firm*—John W. Ericson

[57] ABSTRACT

Laminar electrical cells and batteries of the LeClanche type especially adapted for service at high drain rates with variable duty cycles by the inclusion of cathodes formed as slurries of $MnO_2$ and carbon particles in an electrolyte comprising, by weight, about 2% of $NH_4Cl$, about 25% $ZnCl_2$, and the balance water with a minor amount of mercuric chloride.

2 Claims, 2 Drawing Figures

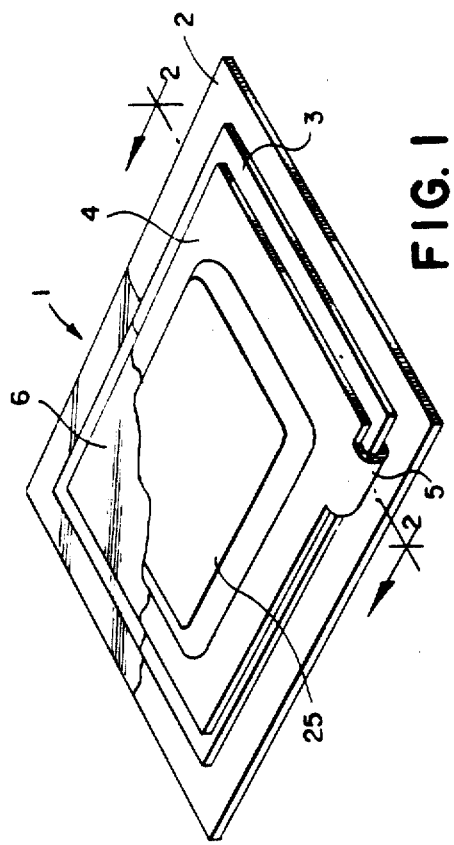
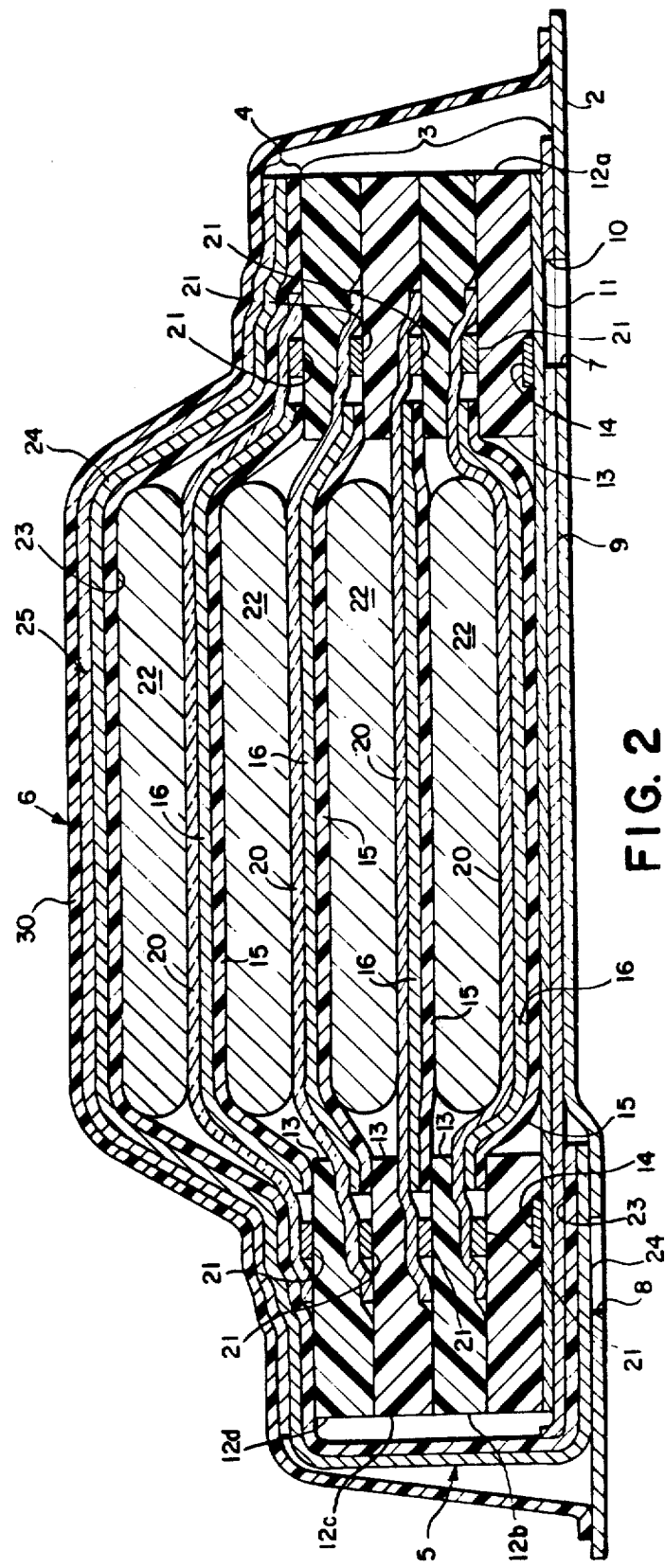

LAMINAR ELECTRICAL CELLS AND BATTERIES

This invention relates to electrical cells and batteries, and particularly to a novel laminar electrical cell and batteries incorporating the same.

Particularly since the widespread acceptance of color as the medium of choice for amateur photography, extensive efforts have been made to increase the capabilities of the photographic equipment available while retaining the operational simplicity of the box camera. Since the existing lighting in many photographic situations is either inadequate or inappropriate for good photography, a supplemental illumination source, and preferably the portable rechargeable electronic flash unit, has been demanded as a part of the photographer's equipment. As a result, cameras have been developed in which automatic focusing, automatic exposure control, self-processing film units, and automatic supplementary electronic flash illumination are all available under the control of an internal digital computer, and are brought into action by the same acts of framing and depressing a button which sufficed to make an exposure with a box camera.

In addition to those improvements in functional capability that have been included in the modern camera, a particular development of major importance in the simplification of the photographer's task has been the provision of a power supply for all of the elaborate exposure control apparatus for the camera in the form of a thin laminar battery incorporated in each film pack for use in the camera.

Of all of the adjuncts to photography now commonly in use, the electronic flash unit is by far the most demanding in its power supply requirements. Before each exposure, a capacitor must be charged with a relatively large amount of electrical energy in as short a time as possible to avoid interference with the photographic process.

Despite the rigorous requirements, batteries have been developed which will provide extremely rapid recharging of electronic flash units and which are still readily accommodated within a film pack. Such batteries are described, for example, in U.S. Pat. No. 4,119,770, issued on Oct. 10, 1978 to Edwin H. Land for electrical cells and batteries and assigned to the assignee of this invention.

Having attained the objectives of providing the desired electrical capacity in the intended space, attention was focused on efforts to simplify the manufacture of such batteries and to reduce the number of components required.

As described in U.S. Pat. No. 4,119,770, the essential elements of a cell for use in batteries meeting the above requirements comprise a slurry cathode in the form of a dispersion of manganese dioxide and carbon particles in an aqueous LeClanche electrolyte, a cellophane separator, a solid electrode in the form of a dispersion of zinc and carbon particles in a binder deposited on a conductive plastic substrate, and a layer of gel electrolyte between the zinc electrode and the separator.

One approach to the simplification of the structure described in U.S. Pat. No. 4,119,770, exemplified in U.S. Pat. No. 4,105,815, involves the replacement of the solid zinc electrode and the gel electrolyte layer with a zinc electrode in the form of a slurry of zinc and carbon particles in aqueous electrolyte. The manufacture of batteries in this form still requires the incorporation of two wet components per cell on line in the battery assembly process.

Other approaches to the problem, in which the solid zinc electrolyte is retained while the gel electrolyte is omitted, are exemplified in U.S. Pat. Nos. 4,125,684; 4,125,685 and 4,161,815 and, most recently, in U.S. application for Letters Patent Ser. No. 295,269, filed on Aug. 24, 1981 by Paul A. Plasse for Laminar Batteries and Methods of Making the Same and assigned to the assignee of this invention. The constructions proposed in these patents, and in the cited copending application, differ in many respects, and in particular in the different ways that are proposed for handling the somewhat intractable cellophane separator, which has been found to be by far the best choice for use in a LeClanche cell environment intended for very high drain service. However, an unexpected problem has been encountered in the attempt to devise LeClanche cells without gel electrolyte for use as electronic flash power supplies.

In recognition of the extreme demands that might be placed on an electronic flash recharging source, testing standards were adopted which were intended to meet the worst tolerable case under which such batteries would be used. For this purpose, as described in detail in U.S. Pat. No. 4,119,770, a test protocol was developed in which an electronic flash unit was charged by the battery, discharged, the battery allowed to rest for 30 seconds, and the discharge and rest cycle repeated to determine the number of cycles that the battery was capable of performing in this way before an undesired length of time was required to recharge the flash unit.

In testing batteries made in accordance with the various constructions proposed in the patents and application cited above in which gel electrolyte was omitted, in most instances it was found that adequate capacity as reflected by this worst case test could be attained. It was anticipated, as a matter of course, that a less rigorous test, during which the batteries would be allowed to rest for longer than 30 seconds between recharge cycles, would demonstrate a reserve capacity that would provide a large safety factor in most situations.

As an excess of precaution, the experiment was made. But instead of exhibiting a capacity for additional recharge cycles with the same recharge time when allowed longer and longer periods of rest between charging cycles, the batteries without gel electrolyte turned out to produce fewer and fewer recharge cycles with increasing rest times. This disquieting discovery meant that the photographer would have to hasten his exposures in order to be sure of getting through the pack.

The object of this invention is to solve the problem of the incongruous behavior of gel-less batteries, and to facilitate the manufacture of batteries without the use of gel electrolyte which will be capable of meeting the requirements of electronic flash photography without restriction on the intervals between exposures so long as they are within the expected shelf life of the film units.

Briefly, the invention is organized about the discovery that a LeClanche cell can be made with a solid powdered zinc electrode and a slurry cathode, without the use of gel electrolyte, that will both exhibit enhanced performance with a high duty cycle and a still further increase in capacity under a lighter duty cycle, if the slurry electrode is made with an electrolyte having a restricted range of compositions incorporating a much lower amount of ammonium chloride, together with a much higher amount of zinc chloride, than has previously been employed in batteries designed for this service. Compositions most effective for this purpose consist of about one to three percent of ammonium chloride, about 20 to 29 percent of zinc chloride, up to one percent of mercuric chloride, and the balance water, by weight based on the weight of solution. The performance of cells using this electrolyte is particularly surprising in view of the fact that the internal impedence of such cells is appreciably higher than that of those formerly preferred. The lowest possible impedence might be thought to be essential when operating in the inordinately high drain environment of the electronic flash recharging cycle, where the battery is required to operate into loads of as low as 0.75 ohms per cell.

While cells and batteries in accordance with the invention are useful under a wide variety of conditions of current, drain and duty cycle, they are particularly well suited for use in the high drain, variable duty cycle environment encountered in the use of electronic flash with photographic equipment. For this purpose, in a preferred embodiment of the invention, the cathode compositions are used in combination with a cellophane separator, which has the advantages particularly pointed out in the above cited U.S. Pat. No. 4,119,770. Most preferably, the cells are made in accordance with the process described in the above cited copending U.S. application Ser. No. 295,269 in which context various illustrative and preferred embodiments of the invention will be described below.

The invention will best be understood in the light of the following description, together with the accompanying drawings, of cells and batteries in accordance with the invention.

In the drawings,

FIG. 1 is a schematic three-quarter perspective sketch of a completed battery in accordance with the invention; and FIG. 2 is a cross-sectional schematic elevational view, with vertical dimensions exaggerated with respect to horizontal dimensions and on an enlarged scale, of a cross-section through the battery of FIG. 1 as seen substantially along the lines 2—2 in FIG. 1.

FIG. 1 shows a completed laminar battery which, in accordance with a presently preferred embodiment of the invention, may be generally similar in its external appearance to the familiar thin flat battery packaged with a Polaroid SX-70 Land film pack, except that for the same number of cells and a similar electrical capacity, it will generally be of somewhat smaller major dimensions and somewhat greater in thickness than the conventional battery. In its external aspects, the battery 1 comprises a card 2 of construction paper, cardboard or the like, which may be pigmented on one or both sides and printed with chosen indicia in any desired manner, that serves as the base of the completed battery and is preferably dimensioned to be accepted in the desired power supply receptacle for which the battery is intended, such as a film pack, cassette recorder, calculator, camera or the like.

The card 2 is laminated in selected regions to a battery comprising a set of components 3 to be described in more detail below, over which there is adhered a pocketed terminal sheet 4 of conductive material which is preferably formed with a tab 5 wrapped around the other components 3 of the battery to present an active terminal on the opposite side in a manner generally familiar to those skilled in the art.

An overwrap layer 6 is preferably laminated to the card 2 over the active components of the battery as illustrated in FIGS. 1 and 2. The overlap layer 6 may be of any suitable inert, chemically stable material, and serves primarily to prevent mechanical interference with underlying components during manipulation of the battery. Polyethylene has been successfully employed for this purpose, although it has a tendency to shrink during heat-sealing that may cause other more dimensionally stable materials such as paper, glassine or various commercially available paper-foil laminates to be preferred.

While the battery 1 may comprise one or any desired number of cells, for purposes of convenience and to illustrate a preferred embodiment for many applications, a four cell battery will be described.

Referring to FIG. 2, the card 2 is provided with a pair of perforations 7 and 8 through which the positive and negative terminals of the battery are accessible. It will be apparent to those skilled in the art as the description proceeds that the battery to be described could be assembled with an anode adjacent the card 2 and a cathode as the most remote electrode, or vice versa, but in accordance with a particularly preferred embodiment to be described, the battery is built up from anode to cathode, such that the negative terminal of the battery will be exposed through the aperture 7 on the card 2, and the positive terminal of the battery exposed through the aperture 8.

Referring to FIG. 2, on the card 2 is mounted an insulating base sheet 9 of kraft paper or the like, or most preferably of the material more fully shown and described in U.S. Pat. No. 4,086,400, the latter comprising a laminate of kraft paper, a thermoplastic liquid-impervious resin overlying the paper, and an overlayer on the resin of a heat sealing adhesive. The adhesive layer would be on the top side as seen in FIG. 2. The kraft paper side of the insulating sheet 9 may be selectively laminated to the card 2 by means of one or more stripes of any suitable adhesive, such as poly (ethylene/vinyl acetate), not shown.

As shown in FIG. 2, the insulating sheet 9 is provided with an aperture 10 in registry with the aperture 7 in the card 2 to expose what, in this case, is the negative terminal of the battery comprising a sheet 11 of metal, preferably a sheet of aluminum foil, for example, of 2 mils in thickness. The metal terminal sheet 11 is laminated to a selected region surrounding the aperture 10 in the insulating sheet 9, and to the peripheral borders of the sheet 9, but is not necessarily, and preferably is not, laminated to the insulating sheet in other regions.

The upper side of the metal terminal sheet 11 is preferably coated with a thin layer of conductive priming adhesive, not shown in FIG. 2, typically from 0.1 to 0.8 mils in thickness, and to this conductive adhesive surface is adhered an insulating frame 12a. The frame 12a is formed with a central aperture 13 which serves to receive other electrochemically active components in a manner to be described.

During the lamination of the frame 12a to the metal terminal sheet 11, one or preferably two vent strips 14 are preferably laminated between the frame 12a and the conductive plastic adhesive coated upper surface of the metal terminal sheet 11. The vent strips 14 may be made of paper or the like, which may be embedded in a thermoplastic resin prior to lamination into the structure shown, but are preferably simply laminated into the thermoplastic matrix comprising the frame 12a and the thin layer of conductive primer overlying the metal terminal sheet 11. These vent strips 14 serve to allow the egress of hydrogen formed during the life of the battery, and, together with the surrounding thermoplastic matrix, prevent the loss of appreciable amounts of water or the ingress of oxygen in a manner more fully illustrated and described in U.S. Pat. Nos. 4,105,831; 4,254,191; and 4,256,813, for example.

For convenience in the illustration of the several features of the battery 1 in a single view, the vent strips 14 are shown in FIG. 2 at 90 degrees to their preferred orientation relative to the tab 5. In accordance with the preferred embodiment of the invention, the strips 14 and the tab 5 are both aligned in the machine direction during battery assembly. However, the arrangement shown is equally efficacious in the completed battery.

An anode electrode structure comprising a sheet 15 of conductive plastic over which is coated a layer 16 of active anode material is located principally within the aperture 13 formed in the frame 12a and has external borders extending around and over the aperture 13, with the conductive plastic sheet 15 being laminated to the edges of the frame 12a around the borders of the aperture 13 and the conductive plastic sheet 15 being laminated to the conductive primer side of the conductive metal end terminal sheet 11 as shown in FIG. 2.

The conductive plastic sheet 15 may be made of any conventional material; for example, of Condulon conductive plastic as made and sold by Pervel Industries, Inc. of Plainfield, Conn. The coated anode particle layer 16 may be made of an aqueous composition comprising zinc powder and a little carbon black together with a binder, coated on the conductive plastic sheet and dried, in a manner described more fully, for example, in U.S. Pat. No. 4,119,770 in column 8, lines 40-63. Rather than being patch printed on the conductive plastic, the conductive zinc particle layer is preferably continuously coated on a conductive plastic web and later cut into patches of the kind shown at 15 and 16 in FIG. 2.

A presently preferred zinc anode coating composition, in percent by weight based on the weight of composition, is as follows:

| Component | Weight Percent |
| --- | --- |
| Zinc Powder | 75.78 |
| H₂O | 19.25 |
| TSPP | 0.056 |
| Calgon 261 | 0.23 |
| Bentone LT | 0.14 |
| Polytex 6510 | 4.16 |
| Carbon Black | 0.38 |
| | 100.0 |

In the above composition, TSPP is tetrasodium pyrophosphate; Calgon 261 LVF is a low molecular weight poly (diallyl dimethyl ammonium chloride) as made and sold by Calgon Corporation of Pittsburgh, Pennsylvania; Bentone LT is an organic derivative of hydrous magnesium aluminum silicate, made and sold by National Lead Co., Inc. of N.Y., N.Y.; and Polytex 6510 is an acrylic emulsion resin made and sold by Celanese Corp. of Newark, N.J. The quantities of Polytex 6510 and Calgon 261 LVF are as solids, excluding water. This composition is uniformly coated on the conductive plastic substrate and dried.

Overlying the anode layer 16 in FIG. 2 is a separator 20 of any conventional material, but preferably of cellophane approximately 1.3 mils in thickness and free of humectants and plasticizers. A fuller description of the properties of cellophane as a separator in an electrochemical system of the type here specifically described by way of illustration appears in above cited U.S. Pat. No. 4,119,770.

For reasons to be described more fully below, the separator 20 is not fully attached along its periphery to the frame 12, but is only selectively adhered thereto by means of stripes of adhesive 21 on either side of the separator along two sides thereof. The adhesive stripes 21 may be of any selected adhesive material, and for example, of poly (ethylene/vinyl acetate), a hot melt polyamide adhesive, or the like.

The components just described, comprising the insulating sheet 9, the metal terminal sheet 11, the frame 12, the conductive plastic layer 15 and its coating 16 of active anode particles, and the separator 20, are preferably formed in a manner described in copending U.S. application Ser. No. 295,269 as a part of a single composite web which acts as a integral subassembly in the process of manufacturing batteries. Overlying the separator 20 in this structure, as seen in FIG. 2, is a cathode 22 formed as a slurry of manganese dioxide and carbon particles in an aqueous electrolyte containing zinc chloride, ammonium chloride and a small amount of mercuric chloride in the initial assembly of the battery. As will be apparent to those skilled in the art, the mercury constituent of the mercuric cloride readily amalgamates with the zinc layer 16 after assembly of the battery and will not be present in the cathode slurry very long after the assembly of the battery.

In accordance with a presently preferred embodiment of the invention, a cathode slurry mix of the following composition is preferred:

| Component | Weight Percent |
| --- | --- |
| MnO₂ | 40 |
| Carbon Black | 8 |
| ZnCl₂ | 12.9 |
| NH₄Cl | 1.0 |
| HgCl₂ | .5 |
| H₂O | 37.6 |
| | 100 |

In the above composition, the preferred carbon black is Shawinigan black, and the preferred MnO₂ is Sedema chemical grade.

If a single cell battery is to be constructed, its next layer would be a composite end terminal 4, in which, for that purpose, it would not be necessary to provide a pocket for most purposes. However, for a multiple cell battery of the type shown in FIG. 2, the next layer over the cathode 22 would comprise another electrode assembly consisting of an electrochemically isolating layer of conductive plastic 15 identical to the lowermost layer 15 described above, on which there is coated on a layer of active anode particles 16 as described previously.

As described above, the second conductive plastic layer 15 is laminated around its edges to a second frame 12b identical to the frame 12a for the lower cell just described. Following assembly of the battery in the form shown in FIG. 2, the layer 15 is in intimate contact with the first cathode layer 22.

The group of components comprising the second frame 12b, with its intercell connector and electrode assembly comprising conductive plastic layer 15 and overlying active anode layer 16, together with another separator 20 adhered in place to the frame 12b by adhesive stripes 21, may be cut from a single composite web that serves as an integral subassembly in the process of manufacturing batteries described in the above cited U.S. application Ser. No. 295,269.

Over the separator 20 attached to the frame 12b as just described is applied another cathode layer 22 of the same composition as the first described above. The assembly just described could be terminated as a two cell battery by adding the terminal assembly 4 as described above. However, in the specific embodiment shown in FIG. 2, a four cell battery is made by adding two more subassemblies comprising frames 12c and 12d, each formed integral with a conductive plastic sheet 15 over which a conductive layer 16 of zinc particles is applied, and over which zinc layer a separator 20 is partly adhered to adjacent portions of the frame by means of adhesive stripes 21.

A cathode layer 22 is deposited on top of each of the structures so described. The uppermost cathode is then covered by the terminal structure 4.

As shown in FIG. 2, the terminal structure 4 comprises a sheet of conductive plastic 23, of Condulon or the like, for example, of 2 mils in thickness, laminated to a cathode end terminal sheet 24 of metal, preferably of aluminum foil 2 mils in thickness and primed on the side adjacent the conductive plastic layer 23 with a thin coat of conductive plastic adhesive employed for the purpose of adhering the conductive plastic sheet 23 to the metal terminal 24 in a manner known in the art per se.

As mentioned above, the end terminal assembly 4 is preferably formed with a pocket comprising a central raised portion 25 as shown in FIGS. 1 and 2. Preferably, the pocketed terminal assembly 4 comprises a sheet of glassine paper 30 adhered to the metal terminal sheet 24 except over the portion comprising the tab 5. The glassine sheet 30 serves as an insulating layer in a manner more fully described in U.S. Pat. No. 4,019,251. The glassine sheet also serves to perform the function of lubricating the die used to form the pocket 25.

While the battery just described in connection with FIGS. 1 and 2 could be assembled by any of the techniques known to those skilled in the art for the assembly of laminar batteries, in accordance with the invention in its preferred embodiment it is assembled by the process described in the above cited U.S. application Ser. No. 295,269.

The performance of batteries made with electrolyte containing various proportions of $NH_4Cl$ and $ZnCl_2$ was investigated by the manufacture of four cell batteries in the manner described above, each containing a three gram cathode and an anode containing 0.444 grams of zinc in each cell. The anode composition was that described above as preferred. The cathode composition was the same as the preferred composition given above, except that the amounts of zinc chloride and ammonium chloride were varied to give the compositions listed in percent by weight below, based on the weight of electrolyte, with the amount of electrolyte being that required to maintain the weight ratio of $H_2O$ to $MnO_2$ constant at 0.955. The amount of $HgCl_2$ was 0.5 percent by weight based on the total weight of cathode slurry. The ratio of $MnO_2$ to carbon black was constant at 5:1. Each batch of cathode slurry was made up with the following composition, in grams:

| | |
|---|---|
| $MnO_2$ | 810 |
| Carbon Black | 162 |
| $H_2O$ | 773.25 |
| $NH_4Cl$ | x |
| $ZnCl_2$ | y |
| $HgCl_2$ | .005w |
| | w | where
 w = total weight of slurry, grams
 x = total weight of $NH_4Cl$, grams
 y = total weight of $ZnCl_2$, grams If 100N is the percent by weight of $NH_4Cl$, and 100Z is the percent by weight of $ZnCl_2$ in the electrolyte, based on the total weight of $NH_4Cl$, $ZnCl_2$ and $H_2O$ (which are the values given in the examples below), then w, x and y are related to N and Z as follows:

$$x = \frac{773.25N}{1 - Z - N} \quad (1)$$

$$y = \frac{773.25Z}{1 - Z - N} \quad (2)$$

$$w = 1754 + \frac{777.12}{\frac{1}{N + Z} - 1} \quad (3)$$

As a specific illustration, in the case of example VII below in which the electrolyte contained 3 percent $NH_4Cl$ and 20 percent $ZnCl_2$, N=0.03 and Z=0.2, so that, from equations 1-3 above, x=30.13 grams, y=200.84 grams, w=1986.15 grams, the composition of Example VII in percent by weight based on the total weight of slurry, was:

| | |
|---|---|
| $MnO_2$ | 40.78 |
| C | 8.16 |
| $NH_4Cl$ | 1.52 |
| $ZnCl_2$ | 10.11 |
| $HgCl_2$ | 0.50 |
| $H_2O$ | 38.93 |
| | 100.0 |

During the process of assembling the batteries in the following examples, perhaps up to ten percent of the water in the cathode slurry would be lost by evaporation. The $HgCl_2$ would be rapidly transformed to $Zn^{++}$ and $Cl^-$ upon amalgamation of the Hg with the anode. Both of these changes would make minor variations in the compositions in the batteries as compared with the "as made" compositions.

Two four cell batteries were made as described above with each of the particular electrolyte compositions given below, for each of two test conditions to be described. These batteries were tested to determine the number of pulses of 50 watt seconds of energy delivered at a constant current of 2 amperes that they would deliver before reaching a closed circuit voltage of 3.7 volts, under two conditions. The first condition was that a 30 second rest time was allowed between pulses; under the second test condition, a rest time of 600 seconds was allowed between pulses. The test results are given in the following table:

| | Composition | | Pulses To 3.7 Volts | |
|---|---|---|---|---|
| Example | NH$_4$Cl | ZnCl$_2$ | 30 seconds | 600 seconds |
| I | 10 | 15 | 33 | 43 |
| II | 10 | 25 | 35 | 42 |
| III | 7.5 | 25 | 36 | 47 |
| IV | 7.2 | 10 | 33 | 57 |
| V | 5 | 15 | 37 | 47 |
| VI | 3 | 12 | 32 | 53 |
| VII | 3 | 20 | 40 | 53 |
| VIII | 3 | 25 | 46 | 55 |
| IX | 3 | 28 | 43 | 64 |
| X | 2 | 10 | 26 | 43 |
| XI | 2 | 15 | 33 | 56 |
| XII | 2 | 21 | 40 | 59 |
| XIII | 2 | 25 | 44 | 56 |
| XIV | 2 | 27 | 44 | 53 |
| XV | 2 | 29 | 45 | 62 |
| XVI | 1 | 25 | 45 | 59 |
| XVII | 0 | 24 | 32 | 61 |
| XVIII | 0 | 30 | 35 | 48 |
| XIX | 23 | 2 | 32 | 30 |
| XX | 23 | 5 | 34 | 28 |
| XXI | 23 | 7.5 | 36 | 16 |
| XXII | 23 | 10 | 39 | 16 |

Example XXII above is typical of the best formulation previously employed in laminar batteries of the kind here described, in which a predominance of NH$_4$Cl is included in the electrolyte to improve conductivity, which is a particularly significant factor when only short rest intervals between pulses, such as 30 seconds, are available for battery recovery. The average of 39 pulses produced by the batteries of Example XXII illustrates good performance under this particular test condition. However, performance is markedly degraded when longer recovery times are allowed, as illustrated by the average of only 16 pulses produced by the batteries of Example XXII when given 600 seconds between pulses. A similar battery without ammonium chloride, as illustrated by Examples XVII and XVIII, will produce an increased number of pulses with longer rest times. In fact, the batteries of Example XVII produced 61 pulses with ten minute intervals between pulses, exceptional performance under these conditions. However, the performance with the short rest time of 30 seconds is not up to the level of the Example XXII batteries. Batteries in accordance with the preferred practice of the invention, represented by Examples VII, VIII, IX, XII, XIII, XIV, XV and XVI in the table above, exhibit excellent performance in both short and long rest time tests; i.e., 40 or more pulses at 30 second rest intervals, and 53 or more pulses at 600 second rest intervals. These batteries include electrolytes with from 1 to 3 percent of NH$_4$Cl, and from 20 to 29 percent of ZnCl$_2$.

The ratio of MnO$_2$ to carbon can be varied from about 2:1 to about 8:1 with corresponding changes in performance as noted below, although economics tend to favor the 5:1 ratio. Higher or lower ratios of MnO$_2$ to carbon can obviously be employed, at the expense of either higher impedance or lower ultimate capacity, if so desired.

The variation of performance to be expected as a function of the ratio of MnO$_2$ to carbon can be estimated from the results of a series of tests made on batteries as described above, except for the changes in the ratio of MnO$_2$ to carbon noted, and except that the pulse capacity test was more demanding in that pulses of 60 watt seconds of energy at 2 amps constant current were employed, with rest intervals of 30 seconds. The test results, tabulated below, indicate a pronounced optimum in the vicinity of a ratio of MnO$_2$/C of 5:1.

| MnO$_2$C Weight Ratio | Pulses |
|---|---|
| 2:1 | 26 |
| 3:1 | 32 |
| 4:1 | 38 |
| 5:1 | 43 |
| 6:1 | 41 |
| 8:1 | 37 |

The amount of HgCl$_2$ is not particularly critical; some HgCl$_2$ has been found desirable to increase the pulse capacity, but there is no advantage in going over two percent, and the value of 0.5 percent has been found preferable.

On the basis of a 3.0 gram cathode and an anode containing 0.444 grams of zinc, as described in the above examples, the weight ratio of elemental Hg to Zn is 0.025 if the level of HgCl$_2$ in the cathode slurry is 0.5%, as described. The effects of mercury on electronic flash recharging capability, as measured by the test described above, are illustrated by Examples XXIII–XXXI summarized below. In these examples, the batteries were made as described above in connection with Examples I–XXII, except for the mercury levels in some of the examples below, with an electrolyte containing 2 percent NH$_4$Cl and 25 percent ZnCl$_2$ (N=0.02 and Z=0.25 in Equations 1-3 above). The mercuric chloride levels in the slurry electrode "as made" are given in terms of the weight ratio of elemental Hg to Zn in the anode, as described above. The test results are for three intervals between pulses of 30 seconds, ten minutes and one hour, the latter results illustrating the effects of further extended rest intervals between pulses. The tests in Examples XXIII–XXVIII were made one month after electrochemical assembly (ECA) of the batteries, and those in Examples XXIX–XXXI were made three months after ECA.

| | | Pulses to 3.7 Volts | | |
|---|---|---|---|---|
| Example | Hg/Zn | 30 seconds | 600 seconds | 3600 seconds |
| XXIII | 0 | 37 | 36 | 45 |
| XXIV | 0.00625 | 42 | 56 | 58 |
| XXV | 0.0125 | 46 | 62 | 56 |
| XXVI | 0.025 | 48 | 65 | 57 |
| XXVII | 0.025 | 43 | 53 | 58 |
| XXVIII | 0.0375 | 42 | 59 | 56 |
| XXIX | 0.0125 | 47 | 60 | 60 |
| XXX | 0.025 | 46 | 51 | 59 |
| XXXI | 0.0374 | 42 | 51 | 56 |

As will be apparent from the results tabulated above, excellent results in this extremely severe performance test are obtained with no mercury, although a marked improvement is attained with even very small amounts of mercury. The major advantage of higher mercury levels is in the reduced formation of hydrogen, which can be compensated for, even at the highest gassing rates encountered with no mercury, by the use of the vents 14 incorporated in the battery as described above.

The electrolyte containing two percent NH$_4$Cl and 25 percent ZnCl$_2$ is presently preferred, both because of the excellent performance of which it is capable, and because it is relatively insensitive to minor changes in proportions that are necessarily associated with production techniques.

While the invention has been described with reference to the specific details of various illustrative embodiments, many changes and variations will become apparent to those skilled in the art upon reading this description, and such can obviously be made without departing from the scope of the invention.

Having thus described the invention, what is claimed is:

1. A laminar electrical cell comprising an anode comprising a solid deposit of zinc powder in a binder on a conductive plastic substrate, a cathode comprising a mixture of $MnO_2$ and carbon particles, a cellophane separator beteween and in contact with said anode and said cathode, and a solution consisting essentially of from about 1 to 3 percent of $NH_4Cl$, from about 20 to 29 percent of $ZnCl_2$, and the balance water, by weight based on the weight of solution, permeating said anode, said cathode, and said separator.

2. The cell of claim 1, in which said solution contains 2 percent of $NH_4Cl$ and 25 percent of $ZnCl_2$.

* * * * *